United States Patent
Huang et al.

(10) Patent No.: US 10,572,708 B2
(45) Date of Patent: Feb. 25, 2020

(54) TOUCH PANEL AND TOUCH DISPLAY DEVICE

(71) Applicant: WUHAN CHINA STAR OPTOELECTRONICS TECHNOLOGY CO., LTD., Wuhan, Hubei (CN)

(72) Inventors: Yao-li Huang, Hubei (CN); Hongsen Zhang, Hubei (CN)

(73) Assignee: Wuhan China Star Optoelectronics Technology Co., Ltd., Wuhan, Hubei (CN)

( * ) Notice: Subject to any disclaimer, the term of this patent is extended or adjusted under 35 U.S.C. 154(b) by 0 days.

(21) Appl. No.: 15/569,090

(22) PCT Filed: May 3, 2017

(86) PCT No.: PCT/CN2017/082820
§ 371 (c)(1),
(2) Date: Oct. 25, 2017

(87) PCT Pub. No.: WO2018/176572
PCT Pub. Date: Oct. 4, 2018

(65) Prior Publication Data
US 2018/0285615 A1   Oct. 4, 2018

(30) Foreign Application Priority Data

Mar. 30, 2017   (CN) .......................... 2017 1 0203325

(51) Int. Cl.
*G06K 9/00* (2006.01)
*G06F 3/041* (2006.01)
*G06F 3/044* (2006.01)

(52) U.S. Cl.
CPC ........... *G06K 9/0002* (2013.01); *G06F 3/044* (2013.01); *G06F 3/0412* (2013.01); *G06K 9/00087* (2013.01)

(58) Field of Classification Search
CPC .................................................... G06K 9/0002
See application file for complete search history.

(56) References Cited

U.S. PATENT DOCUMENTS

2016/0063230 A1* 3/2016 Alten ...................... G06F 21/32
2016/0171281 A1* 6/2016 Park ...................... G06F 1/1643
382/124

(Continued)

FOREIGN PATENT DOCUMENTS

| CN | 104699320 A | 6/2015 |
|---|---|---|
| CN | 204965276 U | 1/2016 |
| CN | 106383623 A | 2/2017 |

*Primary Examiner* — Oneal R Mistry
(74) *Attorney, Agent, or Firm* — Mark M. Friedman

(57) ABSTRACT

The present disclosure provides a touch panel, where the touch panel comprises a substrate, where the substrate comprises a plurality of touch units arranged on a display region in a matrix arrangement. The display region comprises at least one fingerprint identification display region. The fingerprint identification display region comprises a plurality of the touch units. The plurality of the touch units of the fingerprint identification display region comprise at least one fingerprint identification sub-unit arranged on corresponding fingerprint identification display region at intervals, and a plurality of touch identification sub-units arranged on corresponding fingerprint identification display region in a matrix arrangement, to identify touch operation.

17 Claims, 3 Drawing Sheets

(56) References Cited

U.S. PATENT DOCUMENTS

2016/0292487 A1   10/2016  Sun et al.
2016/0350570 A1*  12/2016  Han .................... G06K 9/0002
2017/0147850 A1*   5/2017  Liu ..................... G06K 9/0002
2017/0371213 A1*  12/2017  Wang ................... G06F 3/044

* cited by examiner

TOUCH PANEL AND TOUCH DISPLAY DEVICE

BACKGROUND OF THE INVENTION

1. Field of the Invention

The present disclosure relates to management field of mobile terminals, and more particularly to a touch panel and a touch display device.

2. Description of the Prior Art

Fingerprint identification is a type of authentication technology that is used to compare many global features and local detailed features between different fingerprint images, according to different fingerprints, having different textures, to determine identity. According to different ways of fingerprint collection, fingerprint identification is mainly divided into three categories: optical technology, capacitive (silicon) technology, and ultrasonic (radio frequency) technology.

With popularization of consumer goods, such as smartphones and smart watches, capacitive fingerprint identification is widely used because of its small size, where working operation of the capacitive fingerprint identification is to regard a person's finger as a first electrode of a capacitor and regard a fingerprint sensor as a second electrode of the capacitor. Ridges and valleys of the fingerprint of the fingers relative to a smooth fingerprint sensor are used to create capacitance differences and form gray-scale images. The global and local detailed information of the fingerprint is matched via a fingerprint algorithm for fingerprint identification.

In conventional technology, fingerprint identification is used on mobile phones; however, placement of the fingerprint identification is on a home key or a back or a side of the mobile phone. Arrangement of the fingerprint identification requires taking up some space of bodies of mobile phones, which is not conducive to proportionally increasing screen areas of the mobile phones and is not conducive to make thinner and lighter mobile phones.

In existing technology, in order to make thinner and lighter mobile phones, a fingerprint identification function is integrated into an embedded touch panel. A fingerprint identification region and a touch region are separately arranged, which takes up space. Metal wirings connected with the fingerprint identification region and metal wirings connected with the touch region are on a same layer. However, as the fingerprint identification region and the touch region share space of the common metal wirings, when a number of the fingerprint identification region increases or a number of identification block of the local detailed features of the fingerprint increases, the issue that wirings that cannot be used arises, further limiting the fingerprint identification module to use in the touch panel.

Therefore, the prior art is defective and needs to be improved.

SUMMARY OF THE INVENTION

The aim of the present disclosure is to provide a touch panel and a touch display device capable of solving technical issue that a fingerprint identification display region of the prior art individually arranged on the touch display region occupies space, further being not conducive to improve aperture ratio of panel.

Embodiment of the present disclosure provides a touch panel, where the touch panel comprises: a substrate, where the substrate comprises a plurality of touch units arranged on a display region in a matrix arrangement. The display region comprises at least one fingerprint identification display region. The fingerprint identification display region comprises a plurality of the touch units. A plurality of the touch units of the fingerprint identification display region comprises:

at least one fingerprint identification sub-unit arranged on corresponding fingerprint identification display region at intervals, to identify fingerprint; and a plurality of touch identification sub-units arranged on corresponding fingerprint identification display region in a matrix arrangement to identify touch operation.

The fingerprint identification display region approximates a square region and length of the fingerprint identification display region is 8.5-9.5 mm.

The touch units of the fingerprint identification display region comprises: a first fingerprint identification sub-unit, a second fingerprint identification sub-unit, a third fingerprint identification sub-unit, a fourth fingerprint identification sub-unit, and a fifth fingerprint identification sub-unit.

The first fingerprint identification sub-unit, the second fingerprint identification sub-unit, the third fingerprint identification sub-unit, and the fourth fingerprint identification sub-unit are located at four corners of display region corresponding to the touch units, respectively. The fifth fingerprint identification sub-unit is located at a center of the display region corresponding to the touch units.

Embodiment of the present disclosure further provides a touch panel, where the touch panel comprises: a substrate, where the substrate comprises a plurality of touch units arranged on a display region in a matrix arrangement. The display region comprises at least one fingerprint identification display region. The fingerprint identification display region comprises a plurality of the touch units. A plurality of the touch units of the fingerprint identification display region comprises:

at least one fingerprint identification sub-unit arranged on corresponding fingerprint identification display region at intervals, to identify fingerprint; and a plurality of touch identification sub-units arranged on corresponding fingerprint identification display region in a matrix arrangement to identify touch operation.

Furthermore, the fingerprint identification display region approximates a square region and length of the fingerprint identification display region is 8.5-9.5 mm.

Furthermore, the touch units of the fingerprint identification display region comprises: a first fingerprint identification sub-unit, a second fingerprint identification sub-unit, a third fingerprint identification sub-unit, a fourth fingerprint identification sub-unit, and a fifth fingerprint identification sub-unit.

The first fingerprint identification sub-unit, the second fingerprint identification sub-unit, the third fingerprint identification sub-unit, and the fourth fingerprint identification sub-unit are located at four corners of display region corresponding to the touch units, respectively. The fifth fingerprint identification sub-unit is located at a center of the display region corresponding to the touch units Furthermore, each fingerprint identification sub-unit comprises a plurality of fingerprint identification electrodes; and a plurality of the fingerprint identification electrodes are arranged at intervals.

Furthermore, the touch panel further comprises a touch identification driving module connected with a plurality of the touch identification sub-units, where the touch identification driving module is connected with a plurality of the touch identification sub-units through a first metal wiring.

Furthermore, the touch panel further comprises a fingerprint identification driving module connected with a plurality of the fingerprint identification sub-units, where the fingerprint identification driving module is connected with a plurality of the touch identification sub-units through a second metal wiring; wherein the first metal wiring and the second metal wiring are on different metal layers.

Furthermore, a plurality of fingerprint identification electrodes are common electrodes.

Furthermore, the substrate is a first array substrate, where the first array substrate comprises: a first insulation layer, the second metal wiring arranged on the first insulation layer, a first passivation layer covered on the second metal wiring, a first common electrode layer arranged on the first passivation layer, a second passivation layer arranged on the first common electrode layer, a first flat layer arranged on the second passivation layer, and a first pixel electrode arranged on the first flat layer.

In the fingerprint identification display region, the common electrode passes through a through-hole of the first passivation layer to connect with the second metal wiring.

In a non-fingerprint identification display region, the first metal wiring passes through a through-hole of the second passivation layer to connect with the common electrode layer Furthermore, the substrate is a second array substrate, where the second array substrate comprises: a second insulation layer, a second pixel electrode arranged on the second insulation layer, a third passivation layer covered on the second pixel electrode, a first metal wiring arranged on the third passivation layer, a fourth passivation layer arranged on the first metal wiring, a second common electrode layer arranged on the fourth passivation layer, a second flat layer arranged on the second common electrode layer, and a second metal wiring arranged on the second flat layer.

In the fingerprint identification display region, the second metal wiring passes through a through-hole of the second flat layer to connect with the second common electrode layer.

In a non-fingerprint identification display region, the second common electrode layer passes through a through-hole of the fourth passivation layer to connect with the first metal wiring.

The present disclosure further provides a touch display device, where the touch display device comprises: a touch panel. The touch panel comprises: a substrate, where the substrate comprises a plurality of touch units arranged on a display region in a matrix arrangement. The display region comprises at least one fingerprint identification display region. The fingerprint identification display region comprises a plurality of the touch units, where a plurality of the touch units of the fingerprint identification display region comprises:

at least one fingerprint identification sub-unit arranged on corresponding fingerprint identification display region at intervals, to identify fingerprint; and a plurality of touch identification sub-units arranged on corresponding fingerprint identification display region in a matrix arrangement to identify touch operation.

Furthermore, the fingerprint identification display region approximates a square region and length of the fingerprint identification display region is 8.5-9.5 mm.

Furthermore, the touch units of the fingerprint identification display region comprises: a first fingerprint identification sub-unit, a second fingerprint identification sub-unit, a third fingerprint identification sub-unit, a fourth fingerprint identification sub-unit, and a fifth fingerprint identification sub-unit.

The first fingerprint identification sub-unit, the second fingerprint identification sub-unit, the third fingerprint identification sub-unit, and the fourth fingerprint identification sub-unit are located at four corners of display region corresponding to the touch units, respectively. The fifth fingerprint identification sub-unit is located at a center of the display region corresponding to the touch units.

Furthermore, each fingerprint identification sub-unit comprises a plurality of fingerprint identification electrodes arranged at intervals.

Furthermore, the touch panel further comprises a touch identification driving module connected with a plurality of the touch identification sub-units, where the touch identification driving module is connected with a plurality of the touch identification sub-units through a first metal wiring.

Furthermore, the touch panel further comprises a fingerprint identification driving module connected with a plurality of the fingerprint identification sub-units, where the fingerprint identification driving module is connected with a plurality of the touch identification sub-units through a second metal wiring; wherein the first metal wiring and the second metal wiring are on different metal layers.

Furthermore, a plurality of fingerprint identification electrodes are common electrodes.

Furthermore, the substrate is a first array substrate; the first array substrate at least comprises: a first insulation layer, the second metal wiring arranged on the first insulation layer, a first passivation layer covered on the second metal wiring, a first common electrode layer arranged on the first passivation layer, a second passivation layer arranged on the first common electrode layer, a first flat layer arranged on the second passivation layer, and a first pixel electrode arranged on the first flat layer.

In the fingerprint identification display region, the common electrode passes through a through-hole of the first passivation layer to connect with the second metal wiring.

In a non-fingerprint identification display region, the first metal wiring passes through a through-hole of the second passivation layer to connect with the common electrode layer.

Furthermore, the substrate is a second array substrate; the second array substrate at least comprises: a second insulation layer, a second pixel electrode arranged on the second insulation layer, a third passivation layer covered on the second pixel electrode, a first metal wiring arranged on the third passivation layer, a fourth passivation layer arranged on the first metal wiring, a second common electrode layer arranged on the fourth passivation layer, a second flat layer arranged on the second common electrode layer, and a second metal wiring arranged on the second flat layer.

In the fingerprint identification display region, the second metal wiring passes through a through-hole of the second flat layer to connect with the second common electrode layer.

In a non-fingerprint identification display region, the second common electrode layer passes through a through-hole of the fourth passivation layer to connect with the first metal wiring.

The aim of the present disclosure is to provide a touch panel and a touch display device capable of solving technical issue that a fingerprint identification display region of the prior art individually arranged on the touch region occupies space, further being not conducive to improve aperture ratio of panel.

In order to clearly understand the above description of the present disclosure, the present disclosure will provide detailed description of the preferred embodiments combining with the drawings as follow.

BRIEF DESCRIPTION OF THE DRAWINGS

In order to describe clearly the embodiment in the present invention or the prior art, the following will introduce the drawings for the embodiment shortly. Obviously, the following description is only a few embodiments, for the common technical personnel in the field it is easy to acquire some other drawings without creative work.

DETAILED DESCRIPTION OF THE PREFERRED EMBODIMENTS

Figure 1:
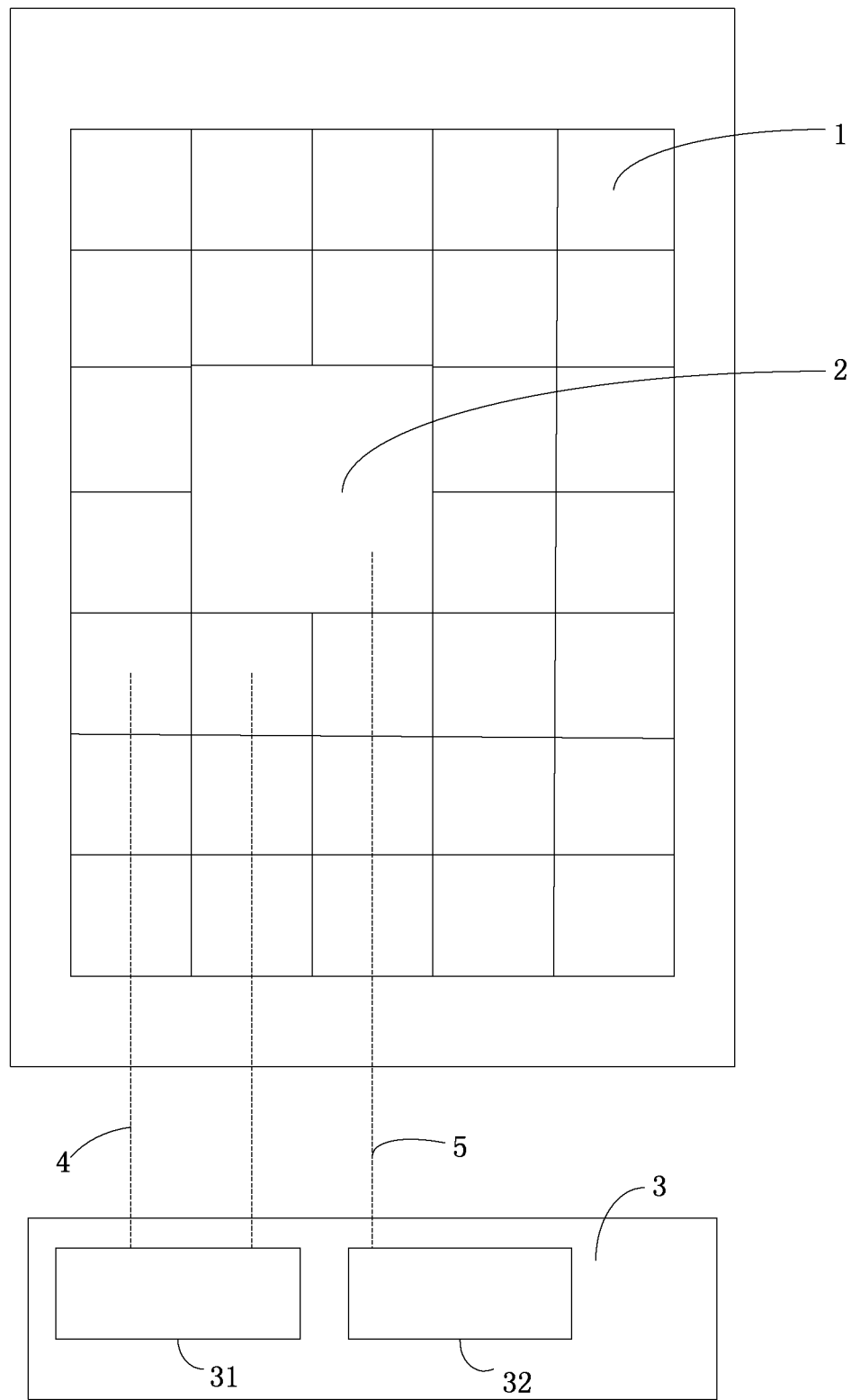
FIG. 1 is a partial structural diagram of a touch panel according to the present disclosure.

In order to more clearly illustrate aim, the technical scheme and effects of the present disclosure, the present disclosure will further be described in detail according to the drawing. It should be understood that the present disclosure has been described with reference to certain preferred and alternative embodiments which are intended to be exemplary only and do not limit the full scope of the present disclosure As shown in FIG. 1, FIG. 1 is a partial structural diagram of a touch panel according to the present disclosure. The touch panel comprises a substrate. The substrate comprises a plurality of touch units 1 arranged on a display region. A plurality of the touch units are in a matrix arrangement and the display region comprises at least one fingerprint identification display region 2. The fingerprint identification display region 2 comprises a plurality of successive touch units 1. Number of the fingerprint identification display region 2 is set according to actual situations. Furthermore, number of the fingerprint identification display region 2 may be one, two, or more. In general, area of the fingerprint identification display region 2 is not greater than area of the display region. In a preferred embodiment, the area of the fingerprint identification display region 2 is matched with a superficial area of a pulp of a finger. Furthermore, length of the fingerprint identification display region, approximating a square region, is 8.5-9.5 mm.

To be specific, the touch unit 1 arranged on the fingerprint identification display region 2 comprises at least one fingerprint identification sub-unit 11 and a plurality of touch identification sub-units 12. At least one fingerprint identification sub-unit 11 is arranged at intervals on a corresponding fingerprint identification display region to identify a fingerprint. A plurality of the touch identification sub-units are distributed on corresponding fingerprint identification display regions, in a matrix arrangement, to identify touch operation. In the embodiment, the fingerprint identification function and the touch identification function are integrated into the fingerprint identification display region. Compared with individually arranging the fingerprint identification display region and the touch identification region, technical scheme of the present disclosure simplifies structure, reduces occupied area of the fingerprint identification display region (the fingerprint identification display region is smaller), and to a certain extent, increases aperture ratio of display panel.

Figure 2:
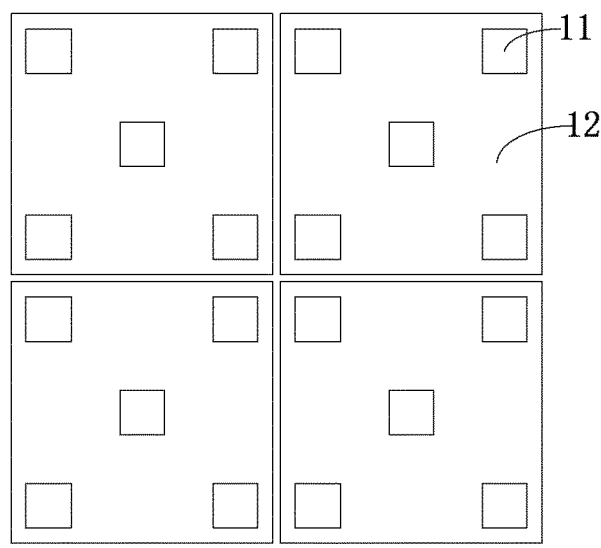
FIG. 2 is a structural diagram of a fingerprint identification region of the touch panel according to the present disclosure.

In a preferred scheme of the embodiment, the fingerprint identification display region 2 approximates a square region. FIG. 2 is a structural diagram of the fingerprint identification display region 2 of the touch panel according to the present disclosure. The fingerprint identification display region 2 comprises more than four touch units 1. Furthermore, the fingerprint identification display region 2 comprises four touch units 1.

Furthermore, the touch units 1 of the fingerprint identification display region 2 comprises more than three fingerprint identification sub-units 11 (length is 100 μm-300 μm). Furthermore, as shown in FIG. 2, the touch unit 1 comprises five fingerprint identification sub-units (not shown in drawings): a first fingerprint identification sub-unit, a second fingerprint identification sub-unit, a third fingerprint identification sub-unit, a fourth fingerprint identification sub-unit, and a fifth fingerprint identification sub-unit. The first fingerprint identification sub-unit, the second fingerprint identification sub-unit, the third fingerprint identification sub-unit, and the fourth fingerprint identification sub-unit are located at four respectively corners of the display region corresponding to the touch units. The fifth fingerprint identification sub-unit is located at a center of the display region corresponding to the touch units.

Figure 3:
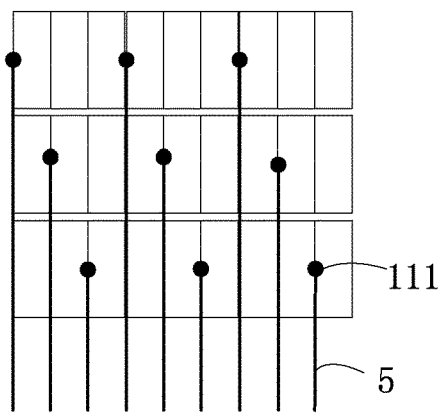
FIG. 3 is a specific structural diagram of electrodes of a fingerprint identification electrode of the touch panel according to the present disclosure.

In a preferred scheme of the embodiment, as shown in FIG. 3, the fingerprint identification sub-unit 11 comprises a plurality of fingerprint identification electrodes 111 (length is 50 μm-100 μm). A plurality of fingerprint identification electrodes 111 are arranged at intervals. Area of single fingerprint identification electrode is a many times larger than area of sub-pixel of the touch panel, for example, three times, four times or more times, but is not limited thereto. Furthermore, the touch units 1 comprise a plurality of touch electrodes (not shown in drawings). A plurality of touch electrodes are arranged at intervals.

In a preferred scheme of the embodiment, the touch panel comprises a driving chip 3, where the driving chip 3 comprises a touch identification driving module 31 and a fingerprint identification driving module 32 (as shown in FIG. 1). The touch unit 1 of a non-fingerprint identification display region and the touch identification sub-unit 12 of the fingerprint identification display region are connected with the touch identification driving module 31 via first metal wirings 4, respectively. At least one fingerprint identification sub-unit 11 is connected with fingerprint identification driving module 32 via a second wiring 5, the first metal wirings 4 and the second wiring 5 are on a same metal layer, or are not on a same metal layer, but is not limited thereto. In a preferred scheme of the embodiment, the first metal wirings 4 and the second metal wirings 5 are on different metal layers.

Figure 4:
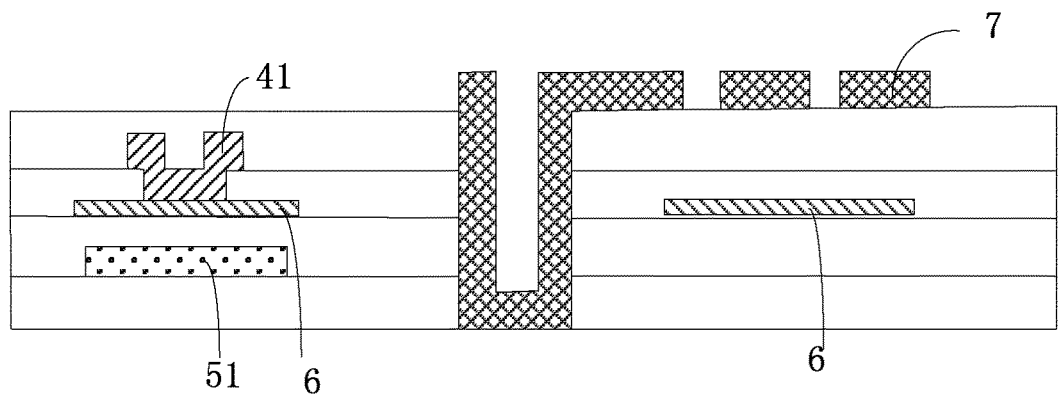
FIG. 4 is a partial structural diagram of a non-fingerprint identification display region corresponding to an array substrate of the touch panel according to a first preferred embodiment of the present disclosure.
Figure 5:
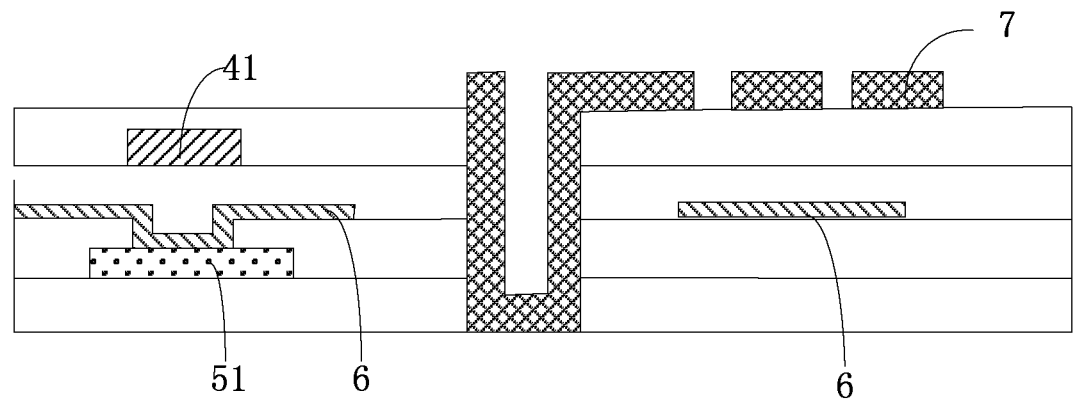
FIG. 5 is a partial structural diagram of a fingerprint identification display region corresponding to the array substrate of the touch panel according to a first preferred embodiment of the present disclosure.

In a preferred scheme of the embodiment, a substrate is a first array substrate. Furthermore, the first array substrate is a bottom common electrode structure. As shown in FIG. 4 and FIG. 5, the first array substrate at least comprises: a first insulation layer (not shown in drawings), the second metal wiring arranged on the first insulation layer 51, a first passivation layer (not shown in drawings) covered on the second metal wiring 51, a first common electrode layer 6 arranged on the first passivation layer, a second passivation layer (not shown in drawings) arranged on the first common electrode layer 6, a first metal wiring 41 arranged on the second passivation layer, a first flat layer (not shown in drawings) arranged on the first metal wiring 41, and a first pixel electrode 7 arranged on the first flat layer.

In the fingerprint identification display region, the first common electrode 6 passes through a through-hole of the first passivation layer to connect with the second metal wiring 51.

In the non-fingerprint identification display region, the first metal wiring 41 passes through a through-hole of the second passivation layer to connect with the first common electrode layer 6.

Figure 6:
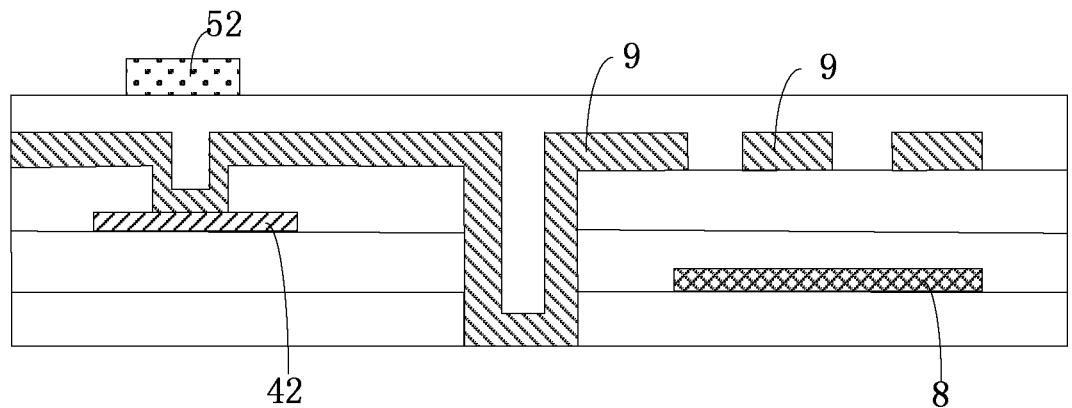
FIG. 6 is a partial structural diagram of a non-fingerprint identification display region corresponding to the array substrate of the touch panel according to a second preferred embodiment of the present disclosure.
Figure 7:
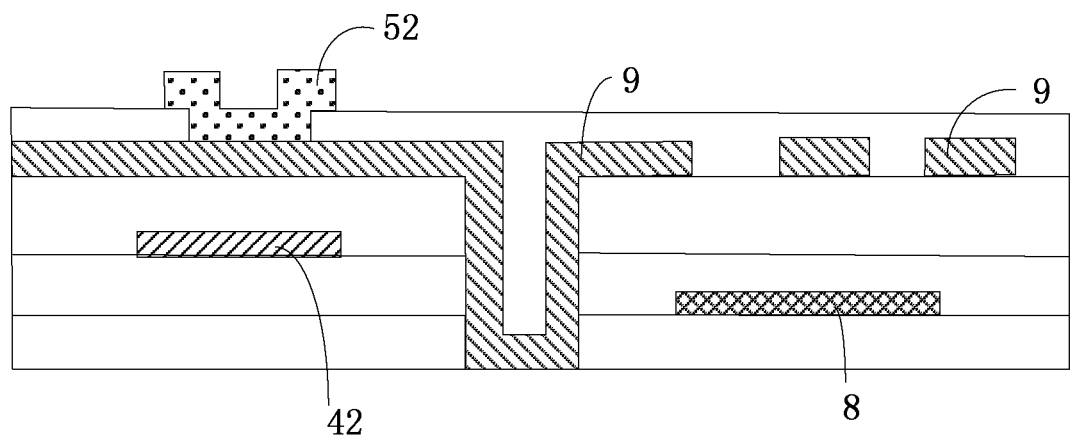
FIG. 7 is a partial structural diagram of a fingerprint identification display region corresponding to the array substrate of the touch panel according to a second preferred embodiment of the present disclosure.

In a preferred scheme of the embodiment, a substrate is a second array substrate. Furthermore, the second array substrate is a top common electrode structure. As shown in FIG. 6 and FIG. 7, the second array substrate at least comprises: a second insulation layer, a second pixel electrode 8 arranged on the second insulation layer, a third passivation layer (not shown in drawings) covered on the second pixel electrode 8, a first metal wiring 42 arranged on the third passivation layer, a fourth passivation layer (not shown in drawings) arranged on the first metal wiring 42, a second common electrode layer 9 arranged on the fourth passivation layer, a second flat layer (not shown in drawings) arranged on the second common electrode layer 9, and a second metal wiring 52 arranged on the second flat layer.

In the fingerprint identification display region, the second metal wiring 52 passes through a through-hole of the second flat layer to connect with the second common electrode layer 9.

In the non-fingerprint identification display region, the second common electrode layer 9 passes through a through-hole of the fourth passivation layer to connect with the first metal wiring 42.

Fingerprint identification signals and touch identification signals are transmitted by metal wirings on different metal layers, which can better avoid mutual interference for transmitting the fingerprint identification signals and the touch identification signals.

It should be noted that, the first metal wiring 41 and the first metal wiring 42 are both the first metal wiring 4. The second metal wiring 51 and the second metal wiring 52 are both the second metal wiring 5. Only different names are used in different labels, effects are the same, and labels are only used to distinguish in the different embodiments.

In the embodiment, the fingerprint identification function is integrated into the touch panel to make the fingerprint identification display region have the fingerprint identification function and the touch identification function without individually arranged on the fingerprint identification region and the touch identification region, which can save manufacturing panel complexities, simplify structure, and improve product competitiveness.

In addition, the fingerprint identification electrode is arranged on the touch panel, and the touch electrode and the fingerprint identification electrode are connected with the driving chip via metal wirings on different metal layers. The touch identification and fingerprint identification are individually controlled, and do not have mutual interference, further improving sensing identification accuracy.

In addition, the touch electrode and the fingerprint identification electrode are both common electrodes without arrangement of any metal layer, further simplifying manufacture procedures and reducing costs. The fingerprint identification is arranged on the display region, without occupying extra space, to achieve thinner and narrower side panel.

In order to explain, partial implementation procedure of the touch panel of the embodiment is described in detail as below. To be specific, when the finger touches the fingerprint identification electrode 111, the fingerprint identification driving module 32 detects identification capacitance on the fingerprint identification electrode 111 (as the finger touches the fingerprint identification electrode 111, the finger and the fingerprint identification electrode 111 of the finger create self-capacitance, the self-capacitance is the identification capacitance), identifies the identification capacitance (the fingerprint identification electrode 111 and ridges of the fingerprint of the finger create the self-capacitance, the fingerprint identification electrode 111 and valley of the fingerprint of the finger create the self-capacitance, as difference value between adjacent capacitances may form multi-grayscale fingerprint images, local feature point of the fingerprint of the finger is detected, further matching and identifying, and executes corresponding operation according to identification result.

In the present disclosure, the fingerprint identification region not just is used for the fingerprint identification, but also has the touch identification function. Namely, the fingerprint identification region adds the fingerprint identification function, at the same time, does not cancel the touch identification function, which improves practicability of the touch panel.

In a preferred scheme of the embodiment, a plurality of the fingerprint identification electrode 111 and the touch electrode are both common electrodes, namely the touch electrode and the fingerprint identification electrode 111 are both a part of the common electrode layer 6 (as shown in FIG. 4 to FIG. 7). The common electrode layer 6 is regarded as the touch electrode and the fingerprint identification electrode without extra arrangement of the metal layer, further simplifying structure and reducing costs.

In order to understand, take the touch panel in 5.5-inch FHD (Full High Definition) for example, length of the touch unit 1 is 4.5 mm Four touch units 1 can compose the fingerprint identification display region 2 approximating a square region, the length of the fingerprint identification display region 2 is about 9 mm, five fingerprint identification sub-units 1 are fetched from the touch unit 1 of each fingerprint identification display region 2. Therefore, the fingerprint identification display region 2 has twenty fingerprint identification sub-units 11, each fingerprint identification sub-unit 11 are divided into nine fingerprint identification electrodes 11, area of each fingerprint identification electrode is equal to area of three sub-pixels. The length of each fingerprint identification sub-unit 11 is about 63 μm, and the length of each fingerprint identification electrode is about 189 μm. Each fingerprint identification electrode 111 is connected with the fingerprint identification driving chip 32 via the second metal wire 5.

The present disclosure further provides a touch display device, where the touch display device comprises the touch panel as described in above embodiment. The detailed structure and operating principle of the touch panel is basically consistent with the description of the above embodiment, which can refer to the description of the above embodiments, therefore it is not described.

To be specific, the touch display device can be the touch display panel, also can be a smart wear display device having the fingerprint identification function, but is not limited thereto.

In the present disclosure, the fingerprint identification is integrated into the touch panel, which makes the fingerprint identification display region have the fingerprint identification function and the touch identification function without individually arranging the fingerprint identification region and the touch identification region, which can save manufacturing panel complexities, simplify structure, and improve product competitiveness.

In addition, the fingerprint identification electrode is arranged in the touch panel, and the touch electrode and the fingerprint identification electrode is connected with the driving chip via different metal layers. The touch identification region and fingerprint identification region are individually controlled, and do not have mutual interference, further improving sensing identification accuracy.

Another, the touch electrode and the fingerprint identification electrode are both common electrodes without arrangement of any metal layers, further simplifying manufacture procedure and reducing cost. The fingerprint identification is arranged on the display region without occupying extra space to achieve thinner and narrower side panel.

As the above, it should be understood that the present disclosure has been described with reference to certain preferred and alternative embodiments which are intended to be exemplary only and do not limit the full scope of the present disclosure as set forth in the appended claims

What is claimed is:

1. A touch panel, comprising:
a substrate, comprising a plurality of touch units arranged on a display region in a matrix arrangement, wherein the display region comprises at least one fingerprint identification display region; the fingerprint identification display region comprises a plurality of the touch units; the plurality of the touch units of the fingerprint identification display region comprises:
at least one fingerprint identification sub-unit arranged on a corresponding fingerprint identification display region at intervals, to identify fingerprint; and
a plurality of touch identification sub-units arranged on a corresponding fingerprint identification display region in a matrix arrangement, to identify touch operation;
wherein the fingerprint identification display region approximates a square region and length of the fingerprint identification display region is 8.5-9.5 mm;
wherein the touch units of the fingerprint identification display region comprise: a first fingerprint identification sub-unit, a second fingerprint identification sub-unit, a third fingerprint identification sub-unit, a fourth fingerprint identification sub-unit, and a fifth fingerprint identification sub-unit;
wherein the first fingerprint identification sub-unit, the second fingerprint identification sub-unit, the third fingerprint identification sub-unit, and the fourth fingerprint identification sub-unit are located at respective four corners of display region corresponding to the touch units; the fifth fingerprint identification sub-unit is located at a center of the display region corresponding to the touch units.

2. A touch panel, comprising:
a substrate, comprising a plurality of touch units arranged on a display region in a matrix arrangement; the display region comprises at least one fingerprint identification display region; the fingerprint identification display region comprises a plurality of the touch units; the plurality of the touch units of the fingerprint identification display region comprises:
at least one fingerprint identification sub-unit arranged on a corresponding fingerprint identification display region at intervals, to identify fingerprint; and
a plurality of touch identification sub-units arranged on a corresponding fingerprint identification display region in a matrix arrangement, to identify touch operation,
wherein the fingerprint identification sub-units are spaced apart from one another by at least two different distances;
wherein the fingerprint identification display region approximates a square region and length of the fingerprint identification display region is 8.5-9.5 mm.

3. The touch panel as claimed in claim 2, wherein the touch units of the fingerprint identification display region comprise: a first fingerprint identification sub-unit, a second fingerprint identification sub-unit, a third fingerprint identification sub-unit, a fourth fingerprint identification sub-unit, and a fifth fingerprint identification sub-unit;
wherein the first fingerprint identification sub-unit, the second fingerprint identification sub-unit, the third fingerprint identification sub-unit, and the fourth fingerprint identification sub-unit are located at respective four corners of display region corresponding to the touch units; the fifth fingerprint identification sub-unit is located at a center of the display region corresponding to the touch units.

4. The touch panel as claimed in claim 2, wherein each fingerprint identification sub-unit comprises a plurality of fingerprint identification electrodes arranged at intervals.

5. The touch panel as claimed in claim 4, further comprising a touch identification driving module connected with a plurality of the touch identification sub-units, wherein the touch identification driving module is connected with a plurality of the touch identification sub-units through a first metal wiring.

6. The touch panel as claimed in claim 5, further comprising a fingerprint identification driving module connected with a plurality of the fingerprint identification sub-units; the fingerprint identification driving module is connected with a plurality of the touch identification sub-units through a second metal wiring; wherein the first metal wiring and the second metal wiring are on different metal layers.

7. The touch panel as claimed in claim 6, wherein a plurality of fingerprint identification electrodes are common electrodes.

8. The touch panel as claimed in claim 7, wherein the substrate is a first array substrate; the first array substrate comprises: a first insulation layer, the second metal wiring arranged on the first insulation layer, a first passivation layer covered on the second metal wiring, a first common electrode layer arranged on the first passivation layer, a second passivation layer arranged on the first common electrode layer, a first flat layer arranged on the second passivation layer, and a first pixel electrode arranged on the first flat layer;

in the fingerprint identification display region, the common electrode passes through a through-hole of the first passivation layer to connect with the second metal wiring;

in a non-fingerprint identification display region, the first metal wiring passes through a through-hole of the second passivation layer to connect with the common electrode layer.

9. The touch panel as claimed in claim 7, wherein the substrate is a second array substrate; the second array substrate at least comprises: a second insulation layer, a second pixel electrode arranged on the second insulation layer, a third passivation layer covered on the second pixel electrode, a first metal wiring arranged on the third passivation layer, a fourth passivation layer arranged on the first metal wiring, a second common electrode layer arranged on the fourth passivation layer, a second flat layer arranged on the second common electrode layer, and a second metal wiring arranged on the second flat layer;

in the fingerprint identification display region, the second metal wiring passes through a through-hole of the second flat layer to connect with the second common electrode layer;

in a non-fingerprint identification display region, the second common electrode layer passes through a through-hole of the fourth passivation layer to connect with the first metal wiring.

10. A touch display device, comprising: a touch panel, wherein the touch panel comprises: a substrate comprising a plurality of touch units arranged on a display region in a matrix arrangement, wherein the display region comprises at least one fingerprint identification display region; the fingerprint identification display region comprises a plurality of the touch units; the plurality of the touch units of the fingerprint identification display region comprises:

at least one fingerprint identification sub-unit arranged on a corresponding fingerprint identification display region at intervals, to identify fingerprint; and a plurality of touch identification sub-units arranged on corresponding fingerprint identification display region in a matrix arrangement, to identify touch operation, wherein the fingerprint identification sub-units are spaced apart from one another by at least two different distances;

wherein the fingerprint identification display region approximates a square region and length of the fingerprint identification display region is 8.5-9.5 mm.

11. The touch display device as claimed in claim 10, wherein the touch units of the fingerprint identification display region comprises: a first fingerprint identification sub-unit, a second fingerprint identification sub-unit, a third fingerprint identification sub-unit, a fourth fingerprint identification sub-unit, and a fifth fingerprint identification sub-unit;

wherein the first fingerprint identification sub-unit, the second fingerprint identification sub-unit, the third fingerprint identification sub-unit, and the fourth fingerprint identification sub-unit are located at four corners of display region corresponding to the touch units, respectively; the fifth fingerprint identification sub-unit is located at a center of the display region corresponding to the touch units.

12. The touch display device as claimed in claim 10, wherein each fingerprint identification sub-unit comprises a plurality of fingerprint identification electrodes arranged at intervals.

13. The touch display device as claimed in claim 10, wherein the touch panel further comprises a touch identification driving module connected with a plurality of the touch identification sub-units; and the touch identification driving module is connected with a plurality of the touch identification sub-units through a first metal wiring.

14. The touch display device as claimed in claim 13, wherein the touch panel further comprises a fingerprint identification driving module connected with a plurality of the fingerprint identification sub-units; and the fingerprint identification driving module is connected with a plurality of the touch identification sub-units through a second metal wiring; wherein the first metal wiring and the second metal wiring are on different metal layers.

15. The touch display device as claimed in claim 13, wherein a plurality of fingerprint identification electrodes are common electrodes.

16. The touch display device as claimed in claim 15, wherein the substrate is a first array substrate; the first array substrate comprises: a first insulation layer, the second metal wiring arranged on the first insulation layer, a first passivation layer covered on the second metal wiring, a first common electrode layer arranged on the first passivation layer, a second passivation layer arranged on the first common electrode layer, a first flat layer arranged on the second passivation layer, and a first pixel electrode arranged on the first flat layer;

in the fingerprint identification display region, the common electrode passes through a through-hole of the first passivation layer to connect with the second metal wiring;

in a non-fingerprint identification display region, the first metal wiring passes through a through-hole of the second passivation layer to connect with the common electrode layer.

17. The touch display device as claimed in claim 15, wherein the substrate is a second array substrate; the second array substrate at least comprises: a second insulation layer, a second pixel electrode arranged on the second insulation layer, a third passivation layer covered on the second pixel electrode, a first metal wiring arranged on the third passivation layer, a fourth passivation layer arranged on the first metal wiring, a second common electrode layer arranged on the fourth passivation layer, a second flat layer arranged on the second common electrode layer, and a second metal wiring arranged on the second flat layer;

in the fingerprint identification display region, the second metal wiring passes through a through-hole of the second flat layer to connect with the second common electrode layer;

in a non-fingerprint identification display region, the second common electrode layer passes through a through-hole of the fourth passivation layer to connect with the first metal wiring.

\* \* \* \* \*